United States Patent [19]
Fukui

[11] Patent Number: 5,222,127
[45] Date of Patent: Jun. 22, 1993

[54] PORTABLE TELEPHONE
[75] Inventor: Satoshi Fukui, Kyoto, Japan
[73] Assignee: Murata Kikai Kabushiki Kaisha, Kyoto, Japan
[21] Appl. No.: 848,915
[22] Filed: Mar. 10, 1992
[30] Foreign Application Priority Data
  Mar. 12, 1991 [JP]  Japan ................................. 3-21850
[51] Int. Cl.⁵ ........................................ H04M 15/00
[52] U.S. Cl. ..................... 379/131; 379/140; 379/58
[58] Field of Search ............... 379/131, 140, 141, 61, 379/58, 207

[56]  References Cited
  U.S. PATENT DOCUMENTS
  4,264,956  4/1981  Delaney ............................. 379/131
  4,754,479  6/1988  Bicknell et al. .................... 379/207

Primary Examiner—Stafford Schreyer
Attorney, Agent, or Firm—Spensley Horn Jubas & Lubitz

[57] ABSTRACT

A portable telephone of a type to which a plurality of subscriber numbers are registered comprises an air timer for measuring a calling period of time from start of calling and end of calling and a memory device for saving and integrating results of measuring by the air timer for each subscriber number. The portable telephone also includes a last call timer, a user timer and a system timer. The memory device includes a RAM. In the RAM, memory areas for the last call timer, user timer and system timer are provided for respective subscriber numbers. As a telephone communication is finished, a calling period of time measured by the air timer is saved in the last memory area to which the subscriber number just used is assigned and this calling period of time is also added up into the user timer memory area and/or system timer memory area for the just used subscriber number.

14 Claims, 7 Drawing Sheets

| ADDRESS | MEMORY CONTENTS | |
|---|---|---|
| 001 | ABBREVIATED NUMBER | 00 |
| 002 | | 01 |
| ⋮ | | ⋮ |
| 100 | | 99 |
| 101 | NAM 1 | LAST CALL TIMER |
| 102 | | USER TIMER |
| 103 | | SYSTEM TIMER |
| 104 | NAM 2 | LAST CALL TIMER |
| 105 | | USER TIMER |
| 106 | | SYSTEM TIMER |
| 107 | NAM 3 | LAST CALL TIMER |
| 108 | | USER TIMER |
| 109 | | SYSTEM TIMER |

FIG. 2

| ADDRESS | MEMORY CONTENTS |
|---|---|
| 1 | NAM 1    SID |
| 2 | NAM 1    MIN |
| 3 | NAM 2    SID |
| 4 | NAM 2    MIN |
| 5 | NAM 3    SID |
| 6 | NAM 3    MIN |
| 7 | FRAME NUMBER |

FIG. 3

| ADDRESS | MEMORY CONTENTS |
|---|---|
| 001 | ABBREVIATED NUMBER    00 |
| 002 | 01 |
| ⋮ | ⋮ |
| 100 | 99 |
| 101 | NAM 1    LAST CALL TIMER |
| 102 | USER TIMER |
| 103 | SYSTEM TIMER |
| 104 | NAM 2    LAST CALL TIMER |
| 105 | USER TIMER |
| 106 | SYSTEM TIMER |
| 107 | NAM 3    LAST CALL TIMER |
| 108 | USER TIMER |
| 109 | SYSTEM TIMER |

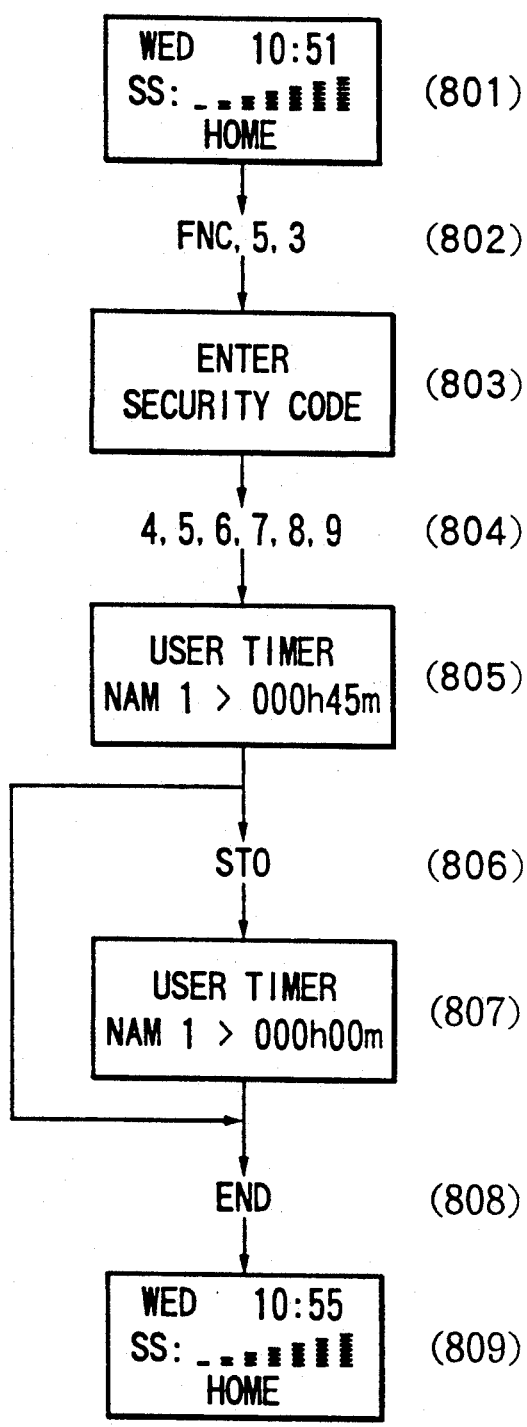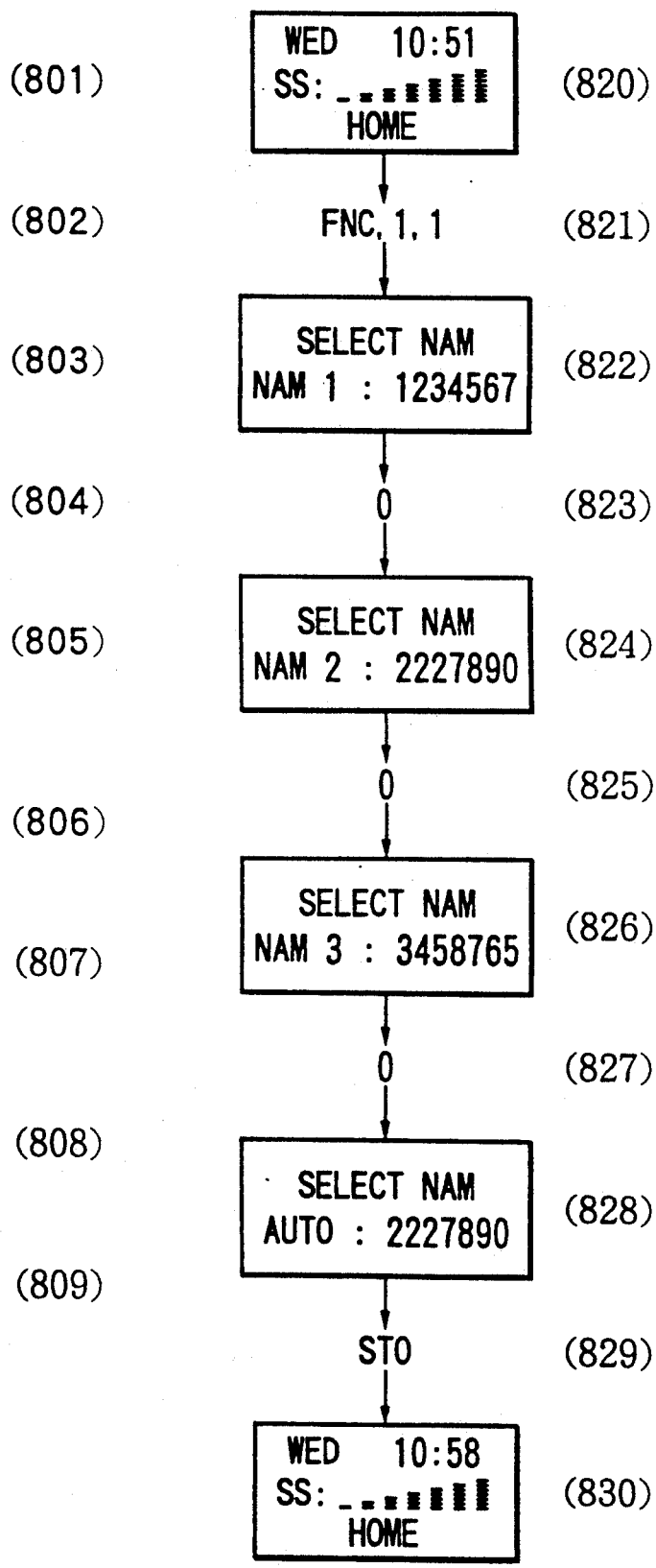

PORTABLE TELEPHONE

TECHNICAL FIELD

The present invention relates to a portable telephone and particularly to a portable telephone which can register a plurality of subscriber numbers.

BACKGROUND ART

Portable telephone sets or pocket telephone sets are one form of mobile telephone sets. Telephone sets carried on a motor vehicle are also one example of such telephones. Today, the portable telephones are practiced as wireless telephone systems. The portable telephone enables a communication between two parties by means of radio communication via a central office or central telephone exchange (radio station or wireless office). Radio frequencies usable in the communication are finite and the usable frequencies are limited to certain areas (referred to as "service areas"). In other words, a certain frequency range is assigned to a particular service area. Therefore, reclamation of frequency is performed in the wireless telephone system to enlarge an actually usable range of frequencies. However, there is a certain limit and this becomes a cause of raising an expense of portable telephones as compared with wire telephones.

The portable telephone enables a wireless or radio communication in the service area so that it is convenient as long as it is used in the service area. An user of the portable telephone can communicate with a third party by a portable telephone wherever he is as long as he carries the portable telephone in the service area.

There may be a case where one wants to talk to someone by a portable telephone from an area to which he is registered as a subscriber, for instance Los Angeles, to another area to which he is not registered as a subscriber, for instance New York. In such a case, a roaming service is available in order to take advantage of a wireless telephone system in New York. Therefore, the communication from Los Angles to New York becomes possible by utilizing such a service. However, the roaming service charges an user extra money. So, if he uses the roaming service quite often, a large bill will be sent to him. Then, it might be less costly to register himself, as a subscriber, with a New York area. Therefore, the portable telephone is designed such that a plurality of subscriber numbers can be registered in the portable telephone.

The portable telephone uses a battery as a power source. Therefore, a time length one can use the portable telephone is limited. Particularly, the portable telephone consumes a large amount of energy during the communication as compared with when the portable telephone is in a standby condition. In addition, since the portable telephone is easy to carry, anyone can take the portable telephone without permission of an owner of the portable telephone. The portable telephone is provided with a timer for measuring and recording a calling period of time and it is possible to know a calling period of time for each calling as well as a total calling period of time. With this function, the owner of the portable telephone can see how much the battery has been used, how much a telephone fee will reach and who has used the portable telephone.

However, conventional portable telephones cannot provide a total calling period of time for each subscriber number if a plurality of subscribers are registered in a single portable telephone, even if the portable telephone has the above-mentioned timer. Especially, if telephone fee rates vary with the subscriber numbers in a single portable telephone (it occurs because, for example, two subscriber numbers have different fee rates), it is impossible to know how much money spent for which subscriber number, based on the total integrated or added up period of time measured by the timer.

SUMMARY OF THE INVENTION

The present invention intends to eliminate the above-described problem and its primary object is to provide a portable telephone which can register a plurality of subscriber numbers and add up calling periods of time for respective subscriber number.

To achieve this object, the present invention provides, according to one aspect thereof, a portable telephone comprising timer means for measuring time elapsed from a start of calling to an end of calling and memory means for saving and adding up the time measured by the timer means for respective subscriber numbers. The memory means may have a function of deleting what is memorized therein and a function of replacing a memory area with another memory area therein.

Even though the portable telephone can hold a plurality of subscriber numbers, it is not possible to use two (or more) subscriber numbers at one time. Therefore, one of the subscriber numbers is selected manually or automatically. In order to save and add up the result of time measuring, memory areas for respective subscriber numbers are prepared in the memory means. Each time the portable telephone is used, the calling period of time is measured by starting measuring the calling time upon start of telephone communication and finishing measuring the calling time upon end of telephone communication. After one calling is finished, the result of calling time measurement is saved in a memory area to which the subscriber number just used is assigned and the calling time is added up or integrated. Therefore, it is possible to know a total calling time for each subscriber number.

These and other aspects, objects and advantages of the present invention will be apparent from a following detailed description as read with the accompanying drawings and appended claims.

BRIEF DESCRIPTION OF THE DRAWINGS

FIG. 2 illustrates contents stored in an EEPROM of the portable telephone according to the present invention;

FIG. 3 shows contents stored in a RAM of the portable telephone according to the present invention;

FIG. 8 is a set of views showing flowcharts of resetting the memorized calling time and setting up subscriber numbers.

DESCRIPTION OF THE PREFERRED EMBODIMENTS

Now, preferred embodiments of the present invention will be described in reference to the accompanying drawings.

Figure 1:
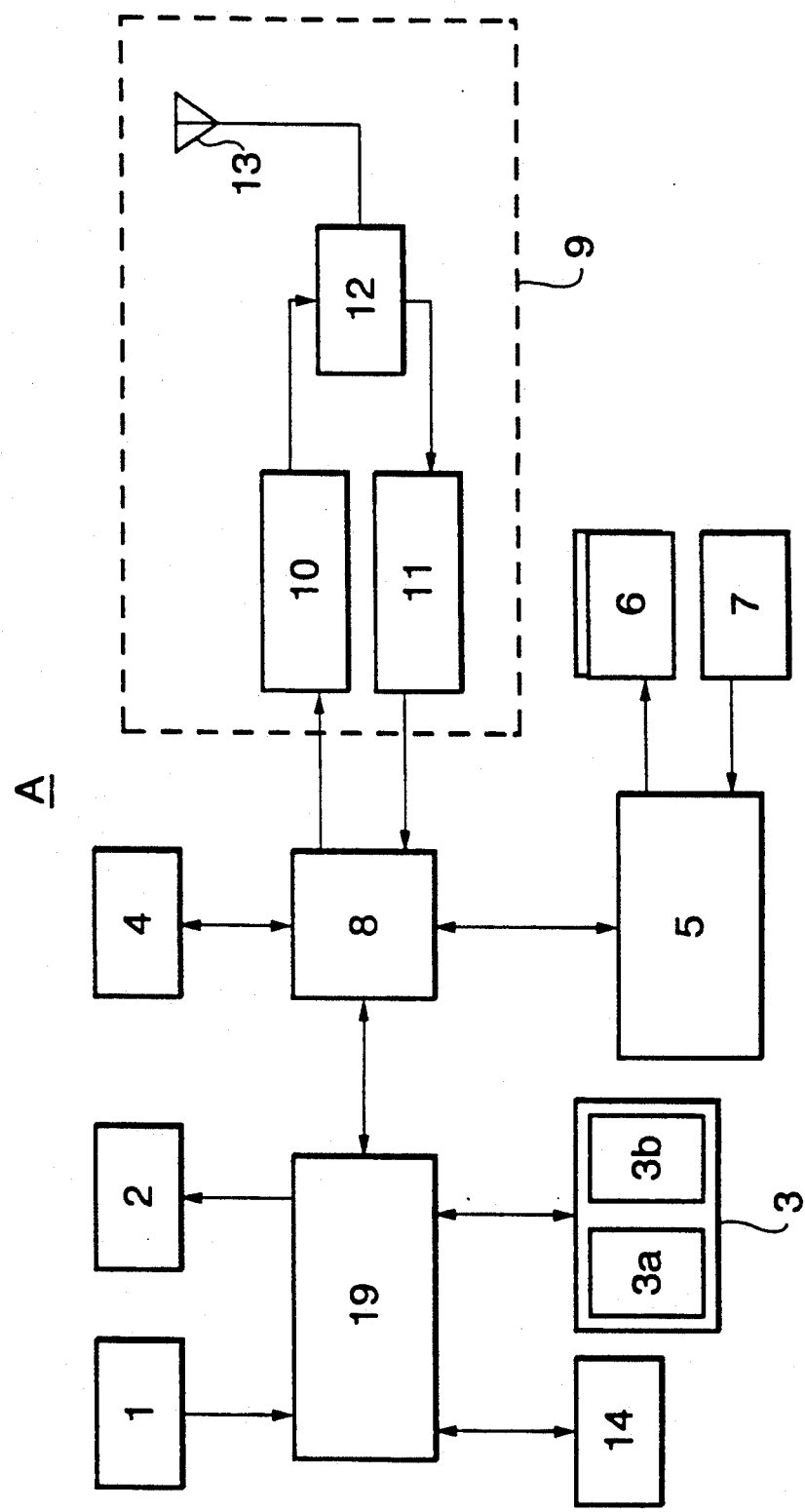
FIG. 1 is a block diagram showing a schematic structure of a portable telephone according to the present invention.

Illustrated in FIG. 1 is a block diagram of a portable telephone A according to the present invention. Numeral 1 designates a key operation part including a ten-key set and other function keys for inputting a subscriber number of called-side party to the portable telephone A and giving other instructions to the portable telephone A. Numeral 2 designates a display part including an LCD (Liquid Crystal Display) for displaying operational conditions of the portable telephone A as well as a calling period of time. Numeral 3 designates a memory part including a ROM 3a and a RAM 3b. A control program for activating the portable telephone A is stored in the ROM 3a. Various data such as coded numbers or abbreviated numbers are stored in the RAM 3b. The RAM 3b also has memory areas for information of calling time. Numeral 14 denotes an air timer. Numeral 4 denotes an EEPROM (Electrically Erasable Programmable ROM) in which information unique or peculiar to the portable telephone A such as subscriber numbers of the portable telephone A and frame number (or manufacture's serial number) of the portable telephone A are stored. Numeral 5 denotes a base band controller for analyzing control signals and/or processing audio frequency signals. A speaker 6 and a microphone 7 are connected with the base band controller 5. An item 8 is an I/O interface between a controller part 19 and peripheral equipments. The controller part 19 includes a CPU. The peripheral equipments include the EEPROM 4, the base band controller 5 and a radio frequency part 9. The radio frequency part 9 includes a signal transmitting part 10, a signal receiving part 11, a duplexer 12 and an antenna 13. The signal transmitting part 10 modulates digital signals and voice signals input from the I/O interface 8 and outputs them from the antenna 13 in the form of radio waves. The signal receiving part 11 demodulates the radio waves received at the antenna 13 and outputs them to the I/O interface 8 in the form of voice signals and/or digital control signals. Designated at 12 is a duplexer by which it becomes possible to use a single antenna 13 for two kinds of frequencies used in the signal sending and receiving.

Referring to FIG. 2, illustrated is what is stored in the EEPROM 4. A "NAM (Number Assignment Module)" is a number used to identify a portable telephone and includes an SID (System Identification) and an MIN (Mobile Identification Number). In this embodiment, three pairs of NAMs (NAM1, NAM2 and NAM3) are registered. The SID is a number assigned to a certain area or company which provides a wireless telephone service and this number is peculiar to such an area or company. Even if one system is built by a plurality of base stations, the same SID is used. Since message of control channel transmitted from the base station contains the SID, the portable telephone A can judge whether or not the service is HOME (a case where a wireless telephone system to which the portable telephone is subscriber-registered is used) or ROAM (a case where a wireless telephone system to which the portable telephone is not subscriber-registered is used) by performing comparison with the SIDs of the NAM1-3 stored in the EEPROM 4. Here, the service means a wireless telephone service or providing such a service and such a service requires special installations which a wire telephone system does not need. The MIN corresponds to the subscriber number (telephone number). Since a calling message sent from the base station includes the MIN together with the SID, the portable telephone A can recognize calling to itself by comparing the SID and MIN contained in the calling message received by the portable telephone A with the SID and MIN of the NAM1-3 memorized in the EEPROM 4. In FIG. 2, a frame number or manufacture's serial number is also memorized in addition to the three pairs of NAMs.

FIG. 3 illustrates what is memorized in the RAM 3b. The RAM 3b has areas for memorizing the reduced or abbreviated numbers. The RAM 3b also has a memory area for a last call timer, a memory area for a user timer and a memory area for a system timer for each NAM. The last call timer memorizes the latest calling period of time. The user timer and system timer respectively add up the calling period of time. Therefore, the calling period for each calling is added up to a total calling period of time as each calling is finished. An user can reset the user timer, but cannot reset the system timer.

Figure 4:
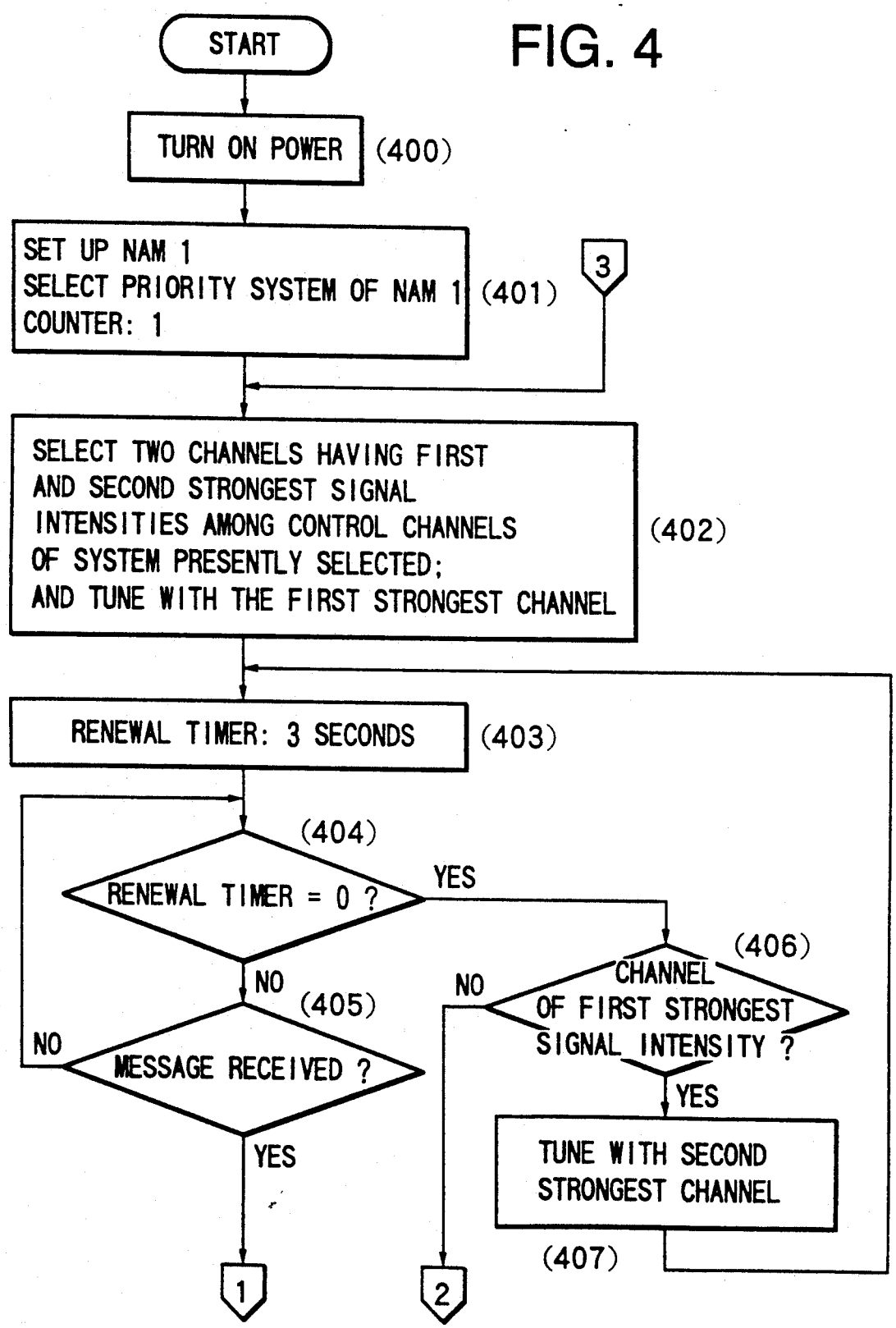
FIGS. 4 and 5 show in combination a flowchart of automatic setting up of subscriber numbers ("AUTO")
Figure 5:
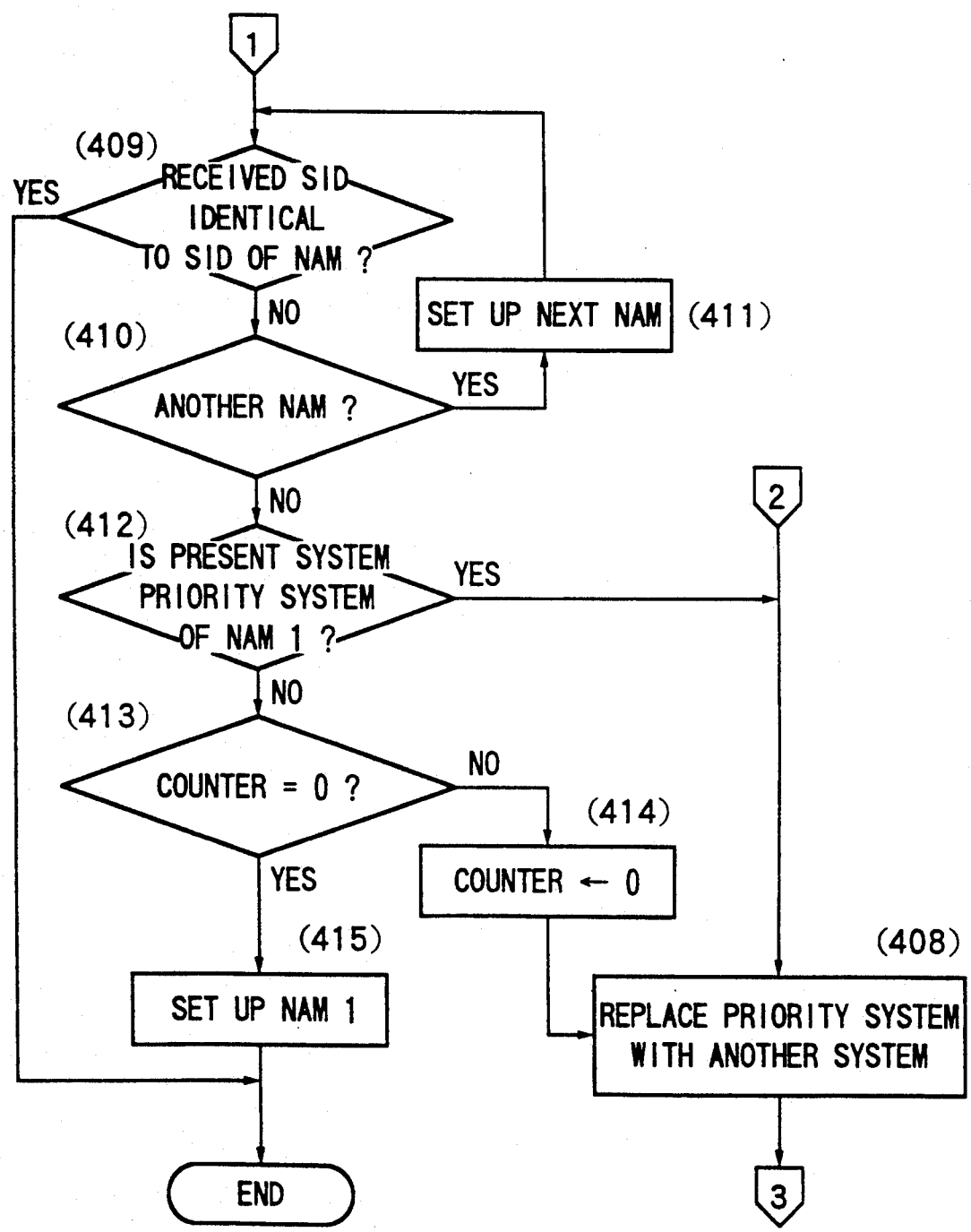

FIGS. 4 and 5 in combination show a flowchart of how a desired NAM is automatically set up among three NAMs registered in the portable telephone A. When a power source is turned on (step 400), the NAM1 is set up and a priority system is chosen (step 401). The priority system is a radio telephone system of a service company to which an user is registered as a subscriber, if there are more than one service companies in a same area. A plurality of control channels are received through the selected system, and two channels which have first and second strongest signal intensities are selected. Then, the first strongest control channel is tuned up (step 402). A message receiving is performed within a time set by a renewal timer (steps 403, 404 and 405). If any messages are not received and the time set by the renewal timer elapses, the second strongest control channel is tuned to (steps 406, 407) to receive the message. In this case, if the time set by the renewal timer elapses again, the priority system is replaced with another system (step 408, FIG. 5) and the operation returns to the step 402. On the other hand, if a message is received, the SID contained in the message and the SIDs of the NAM1-3 stored in the EEPROM 4 are compared with each other in turn (steps 409, 410 and 411, FIG. 5). If there are same SIDs, it means that the portable telephone A is a telephone which is registered to this particular radio telephone system. If there are no same SIDs, the priority system is switched to another system (steps 412, 413, 414 and 408, FIG. 5), so as to try to receive the message of the control channel (step 402, FIG. 4). If there are no same SIDs in even this case, it means that the portable telephone A is not registered as a subscriber telephone to these radio telephone systems, and the roaming is performed to the NAM1 (step 415, FIG. 5). As described above, it is possible to set up a desired NAM or NAM to be used, i.e., a subscriber number, by comparing the SID contained in the message of the control channel with the SIDs of the NAM1-3 of the EEPROM 4.

Figure 6:
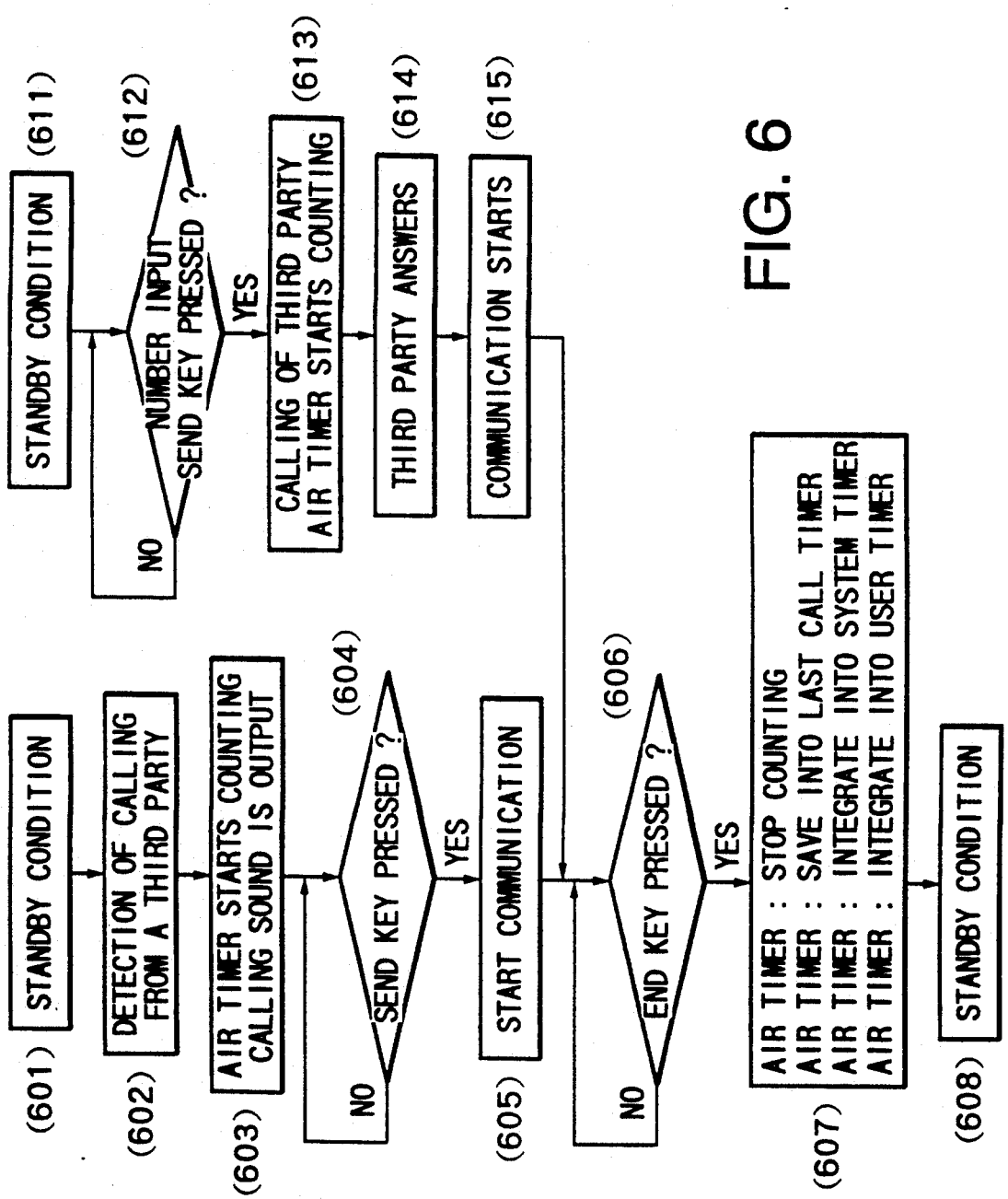
FIG. 6 is a flowchart of measuring a calling period of time.

FIG. 6 shows a flowchart of how a calling period of time is measured and added up in case of call-receiving and call-transmitting respectively. First, a process of call-receiving will be described. When the power source is turned on, the process shown in FIGS. 4 and 5 are performed such that the NAM to be set up is determined and the telephone A is brought into a standby condition while tuning up with a calling channel (step 601). The SID and MIN contained in the message transmitted through the calling channel are compared with the SID and MIN of the set up NAM among the NAM1-3 stored in the EEPROM 4, and if the SIDs and MINs are the same, it is judged as a call-receiving detection (step 602). In this case, a calling sound is output from the speaker 6 (FIG. 1) and the air counter starts counting (step 603). The air counter measures a calling period of time. Results of counting by the air timer is displayed real time at the display part 2. When an user (called party) presses a function key "SEND" provided in the key operation part 1 as he notices the calling sound (step 604), the calling party can talk to the called party (step 605). Since the results of counting by the air timer is displayed real time on the display part 2 during the telephone communication, the portable telephone user can talk to the calling party while seeing a calling period of time. The user presses another function key "END" provided in the key operation part 1 if he wants to finish the telephone communication (step 606). Even though it is not illustrated, the telephone communication may be cut by the calling party. As the communication is finished, the air timer stops counting and the results of time measuring by the air timer is saved and integrated in an area corresponding to the set up NAM among the memory areas provided for respective subscriber numbers in the RAM 3b (step 607). For example, if the NAM1 has been set up, the counting result of the air timer is saved in a last call timer memory area for NAM1 and integrated or accumulated in the user timer memory area for NAM1 and the system timer memory area for NAM1 respectively. The air timer starts counting at the step 603 because sometimes a calling period of time for which generally no money is charged if it is a wire telephone system is charged and because occasionally the other party has to pay.

Next, a process of call-transmitting will be described with FIG. 6. As the electric power is turned on, the same process as the call-receiving process is performed and the telephone is brought into a standby condition (step 611). Then, the user inputs the subscriber number of a person the user wants to talk to using the ten-key of the key operation part 1 and presses the function key "SEND" (step 612). Upon pressing the "SEND" key, the calling of the other party starts and the air timer starts counting simultaneously (step 613). When the other party answers the phone (step 614), the calling party can talk to the other party (step 615). The process of finishing the telephone communication is same as in the call-receiving process.

Figure 7:
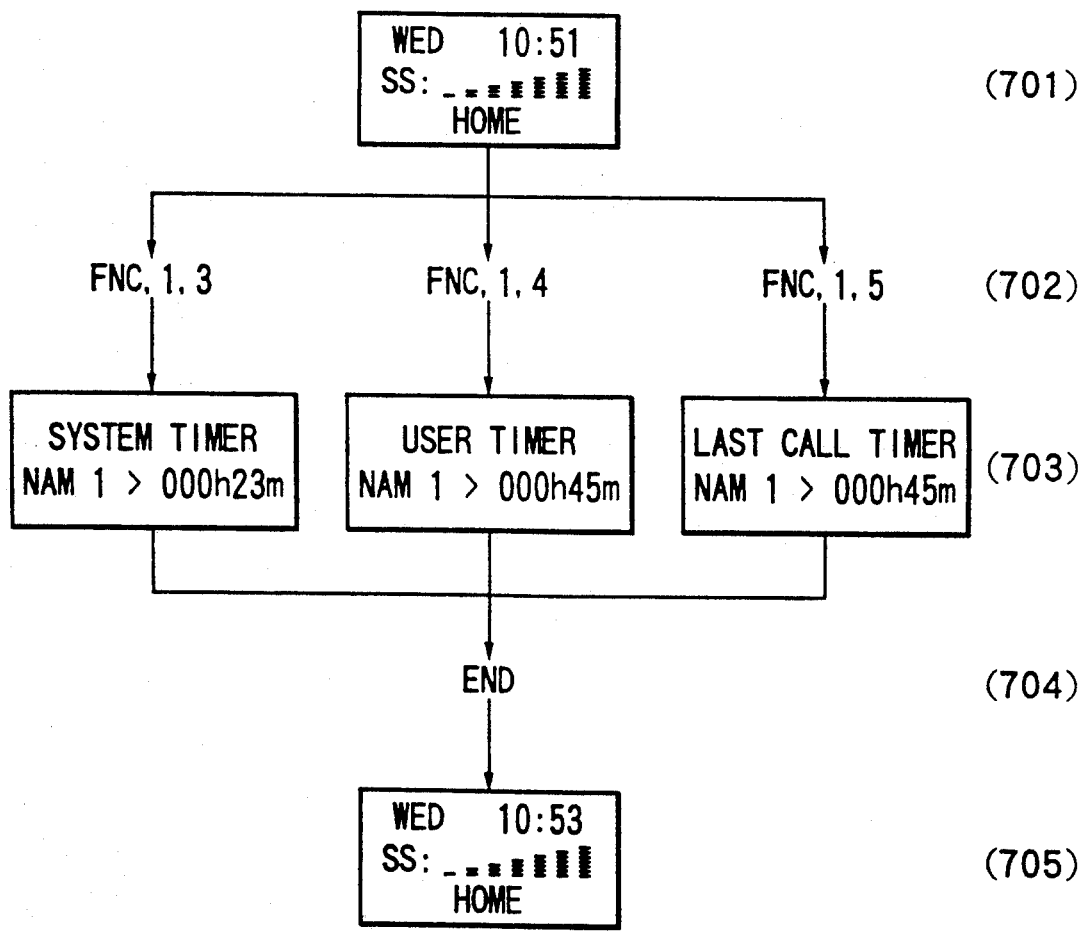
FIG. 7 illustrates a flowchart of making reference to the memorized calling time.

FIG. 7 shows an operation of referring to three kinds of timer areas formed in the respective NAMs of the RAM 3b. At the standby situation, displayed are a day of the week ("WED" in the illustration), time ("10:51"), signal strength ("SS" and≡≡≡ in the illustration) and "HOME/ROAM" indication ("HOME" in the illustration) (step 701). When one of the function keys, "FNC", of the key operation part 1 is pressed and [1] [3], [1] [4] or [1] [5] is input with the ten-key (step 702), the NAM which is set up at that moment ("NAM1" in the drawing) and values of respective timers are displayed on the display part 2 (step 703). If [1] and [3] are input, the value of the system timer is displayed ("1 hour and 23 minutes"). If [1] and [4] are input, the value of the user timer is displayed ("45 minutes"). If [1] and [5] are input, the value of the last call timer is displayed ("45 minutes"). When the user confirms the contents of the timer on the display 2, another function key "END" is pressed at the next step (step 704). Then, the program returns to the standby condition (step 705).

Referring now to FIG. 8(a), an operation of resetting the user timer is shown. After the telephone is set into the standby condition (step 801), the function key "FNC"0 of the key operation part 1 is pressed and [5] and [3] are input with the ten-key (step 802). Then, an indication which urges inputting of security code is displayed (step 803). The security code input operation is required in order to prevent a third party from resetting the user timer. The security code is input by manipulating the key operation part 1 (step 804), but it is not displayed on the display 2 since someone would see the security code if it was displayed. If a correct security code is input, the presently set up NAM and the contents of the user timer are displayed (step 805). The user timer can be reset (step 807) by pressing a function key "STO" provided in the key operation part 1 (step 806). If the "END" key of the key operation part 1 is pressed (step 808), the telephone is brought into the standby condition (step 809). When the resetting is not performed at the step 805, the user presses the END key to bring the telephone into the standby condition.

The referring and resetting operations for each timer shown in FIGS. 7 and 8(a) are performed to each timer of the presently set up NAM. Therefore, if the user wants to refer or reset the timer of other NAMs, the set up NAM has to be changed.

FIG. 8(b) illustrates how the presently set up NAM is changed to another NAM. When the telephone is in the standby condition (step 820), the "FNC" key is pressed and then [1] and [1] are input with the ten-key (step 821). As a result, the presently set up NAM and MIN are displayed ("NAM1" and "1234567") (step 822). Then, [0]s are input continuously by pressing the ten-key (steps 823, 825 and 827). Upon pressing the [0] key, the NAM and MIN are changed like this: NAM1-→NAM2→NAM3→AUTO→NAM1 cyclically on the display (steps 823-828). Therefore, the user presses the STO key when he sees a desired NAM (step 829) such that the desired NAM is set up. Step 830 shows this situation with the telephone being in the standby condition. If the user wants to set up the NAM to "AUTO", the NAM is automatically set up in the manner as shown in FIGS. 5 and 6. In this way, after the NAM is changed, it is possible to refer the timers of another desired NAM or reset the timers.

This particular embodiment deals with the portable telephone, but the present invention may be applied to other wireless telephones such as a mobile telephone. Further, if the user wants to know the total calling period of time, like the conventional portable telephones, the time counts of the system timer and user timer, which are memorized for each subscriber, may be added up and then displayed. In this embodiment, although the resetting of the user timer is performed for each NAM, all the user timers may be reset at one time by a single resetting operation.

We claim:

1. A portable telephone of a type to which a plurality of subscriber numbers are registered, comprising:
    time measuring means for measuring a calling period of time from start of calling to end of calling; and
    memory means for saving and integrating results of measuring by the time measuring means for each subscriber number.

2. The portable telephone of claim 1, further including display means for displaying the results of time measuring and results of integration.

3. The portable telephone of claim 1, wherein the memory means includes a memory area for storing a latest calling period of time for each subscriber number.

4. The portable telephone of claim 1, wherein the memory means includes at least two integration memory areas for integrating the results of time measuring for each subscriber number.

5. The portable telephone of claim 1, wherein the memory means includes a clearable integration memory area and a non-clearable integration memory area for each subscriber number.

6. The portable telephone of claim 1, wherein a security code peculiar to the portable telephone can be set up, and there is provided for each subscriber number an integration memory area which is clearable only when the security code is confirmed.

7. The portable telephone of claim 1, wherein the time measuring means starts time measuring upon detecting a calling from a third party.

8. The portable telephone of claim 1, wherein the time measuring means starts time measuring as a calling to a third party starts.

9. The portable telephone of claim 1, further including display means for displaying a history of time measuring by the time measuring means.

10. The portable telephone of claim 1, wherein the time measuring means stops time measuring upon detecting an end of calling to a third party.

11. The portable telephone of claim 1, wherein results of time measuring by the time measuring means are saved in the memory means upon ending of a telephone communication.

12. The portable telephone of claim 1, wherein results of time measuring by the time measuring means are integrated into the memory means upon detecting an end of telephone communication.

13. The portable telephone of claim 1, further including means for adding up results of calling time integration of each subscriber number so as to display a total calling period of time for all the subscriber numbers.

14. The portable telephone of claim 1, further including means for simultaneously clearing results of integration stored for each subscriber number.

* * * * *